July 5, 1949.  F. J. FONTANA  2,474,834
APPARATUS FOR GAS-SOLID CONTACTING OPERATIONS
Filed Nov. 8, 1945  4 Sheets-Sheet 4
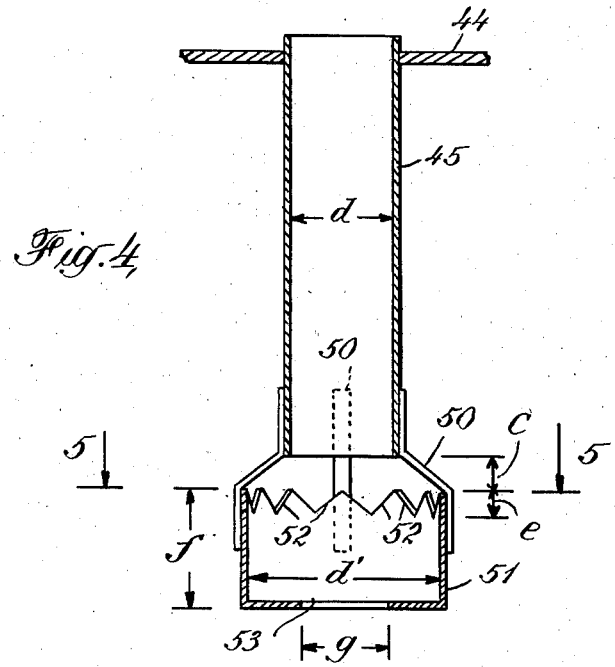
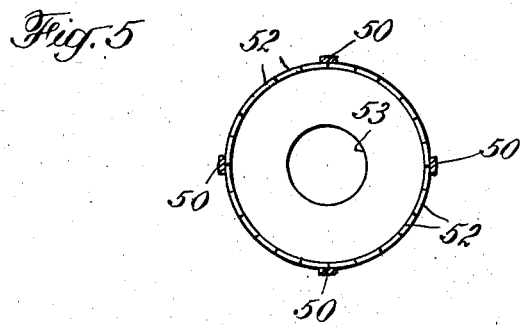
INVENTOR
FRANK J. FONTANA.
BY
Purvis, Davis, Marvin & Edmonds
ATTORNEYS Patented July 5, 1949

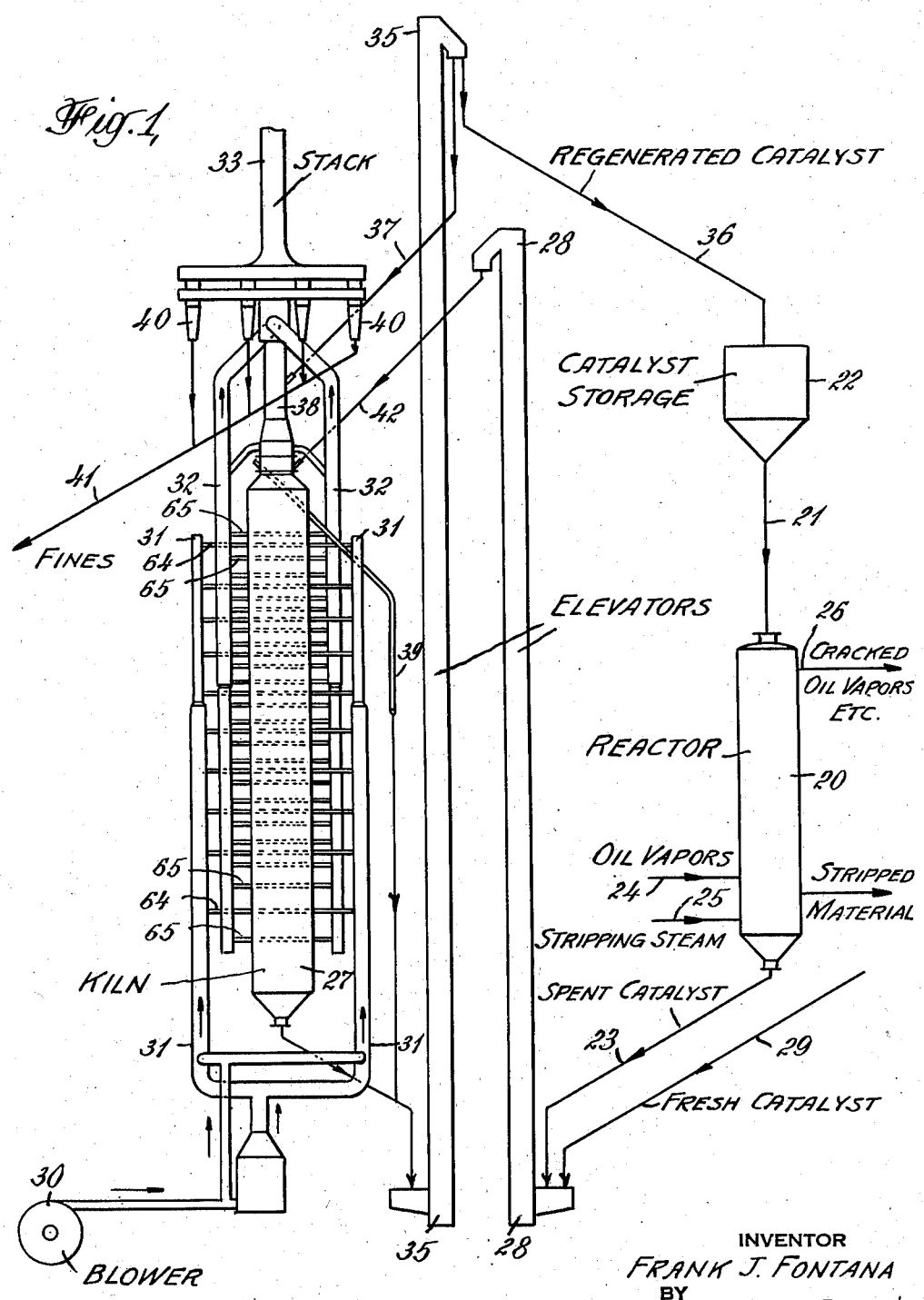

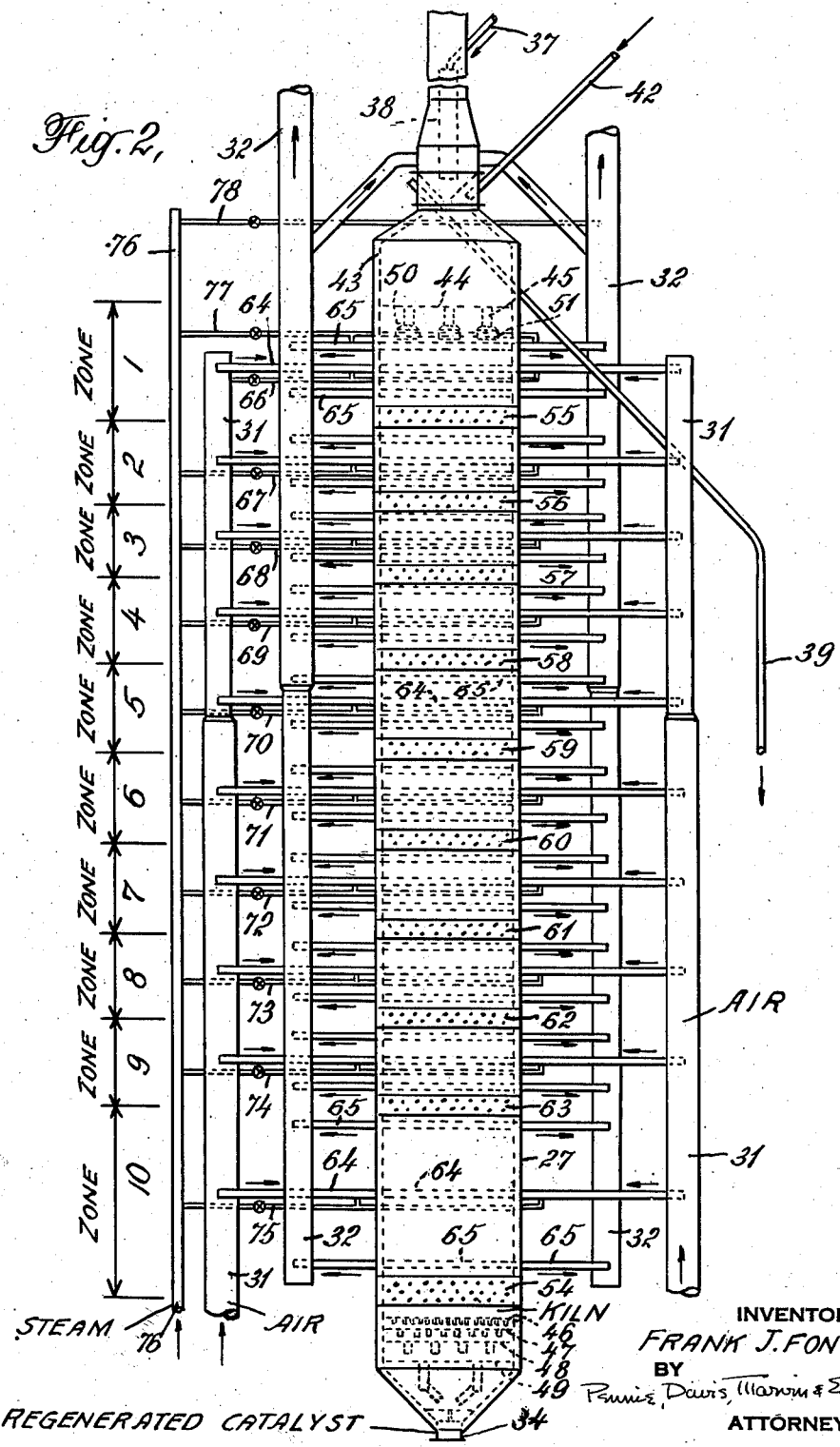

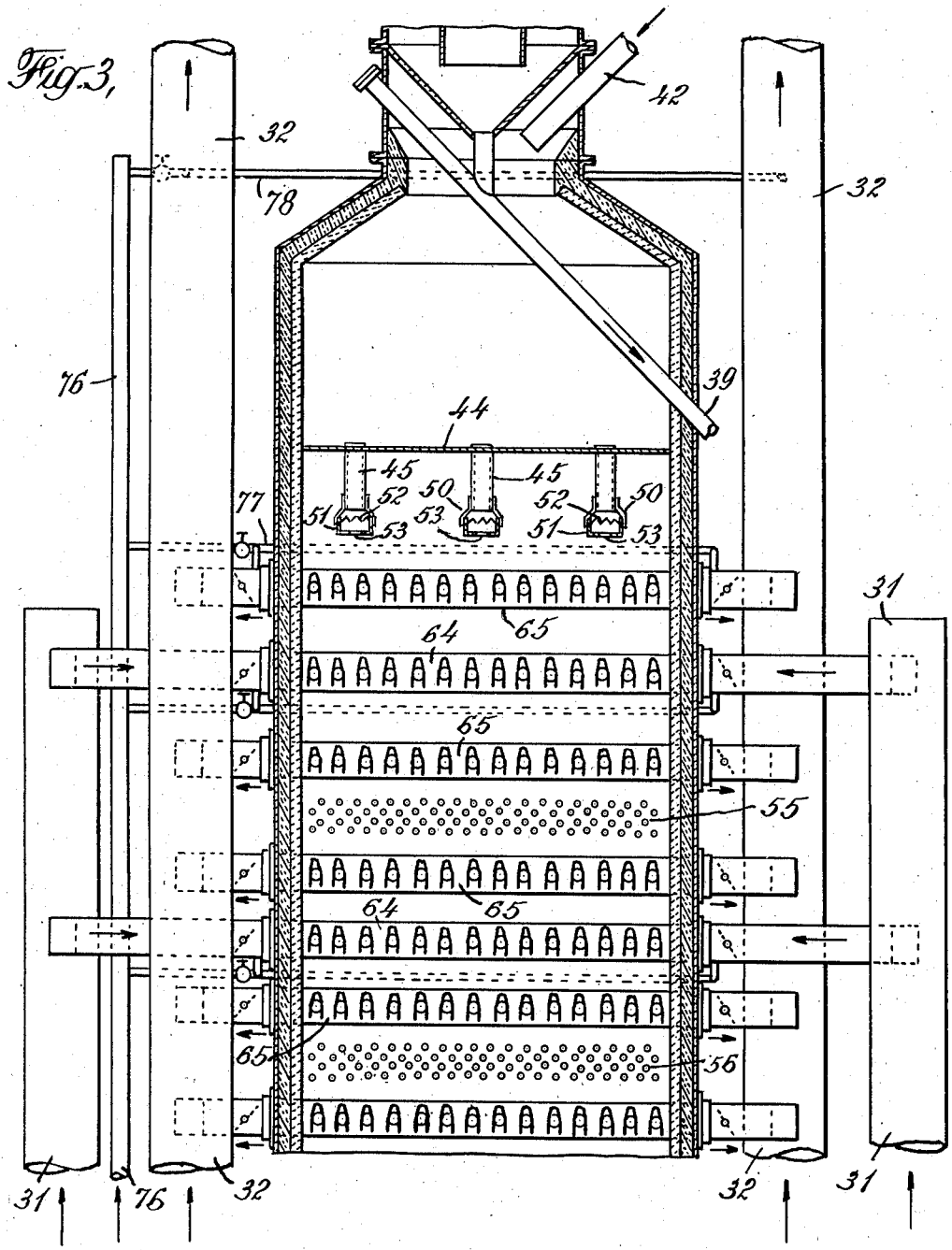

2,474,834

UNITED STATES PATENT OFFICE 2,474,834

APPARATUS FOR GAS-SOLID CONTACTING OPERATIONS

Frank J. Fontana, Long Beach, Calif., assignor, by mesne assignments, to Houdry Process Corporation, Wilmington, Del., a corporation of Delaware Application November 8, 1945, Serial No. 627,405

3 Claims. (Cl. 23—288)

This invention relates to improvements in apparatus in which a downwardly moving bed of a granular solid is contacted with an aeriform fluid. The invention is particularly valuable as applied to regenerating kilns in which partially or completely spent granular catalyst from an oil cracking operation is subjected to burning to remove carbonaceous deposits, and it will be specifically described in that connection. In the instance of such kilns, the aeriform fluid is a combustion-supporting gas, conventionally air.

It is highly desirable in the operation of such kilns that the rate of downward flow of the granular catalyst be substantially uniform across the kiln; otherwise, irregularities in burning occur and the efficiency and capacity of the kiln are reduced. It is equally highly desirable that irregularities in the downward movement of the catalyst through the kiln be avoided, since these may become abrupt or periodic or both, imposing severe stresses on the kiln structure and causing degradation of the granular catalyst with production of fines.

In the conventional regenerating kiln operating on a granular catalyst, regularity of catalyst flow downwardly through the kiln and uniformity of catalyst flow across the shaft of the kiln is sought to be attained by providing, in conjunction with a plurality of vertically disposed cylindrical catalyst distributing tubes in the upper portion of the kiln below the point of catalyst introduction, a series of apertured collector plates or baffles in the lower part of the kiln above the point of catalyst discharge, the lowest of the baffles having the fewest apertures, and each above having more than the next below, the apertures in each baffle being arranged with respect to the apertures in the next lower baffle, or the catalyst discharge port in the lower end of the kiln (in the case of the lowest baffle), so that the several paths of flow through the apertures in the highest baffle are eventually gathered in a single path of flow through the catalyst discharge port.

Theoretically it would seem that substantial uniformity and regularity of catalyst flow could be readily developed and maintained by the above-described arrangements, but in actual practice experience has been otherwise.

In accordance with the present invention, I achieve substantial improvements in regenerating kiln operation, particularly with respect to regularity and uniformity of catalyst flow, by associating with the catalyst distributing tubes in the upper portion of the kiln means which substantially eliminate short rushes or slides of catalyst from the tubes. As indicated, I have found that these short rushes or slides, which are due to the tendency of the tubes to empty faster than they are filled, are, to a large measure, responsible for faulty catalyst flow in the conventional regenerating kiln.

My invention will be readily understood from the accompanying drawings which, while diagrammatic and conventional, are in general of scale proportions. In the drawings, Fig. 1 is a flow diagram of a cracking system embodying a kiln of the type to which my invention most particularly relates;

Fig. 2 is an elevation of a kiln, such as that illustrated in Fig. 1, equipped according to my invention;

Fig. 3 is an enlarged section of the upper part of the kiln illustrated in Fig. 2;

Fig. 4 is a vertical section through one of the distributing tubes and associated elements;

Fig. 5 is a section taken on line 5—5 of Fig. 4.

Referring to Fig. 1 as a diagram of the cracking operation as a whole: a charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 pounds per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the catalyst storage chamber 22 by means of bucket elevator 35. Part of the regenerated catalyst passes from the head of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. In this manner the proportion of fines in the circulating catalyst can be kept within a chosen maximum. As a control, the proportion of the stack gases diverted through the elutriator can be varied or the proportion of the regenerated catalyst diverted to the elutriator can be varied. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Referring now particularly to Figs. 2 and 3 showing the kiln of Fig. 1 in greater detail: the kiln comprises a square, thermally-insulated, and refractory-lined shell 43. To promote uniform distribution of catalyst over a horizontal section of the kiln, a distributor plate 44 carrying distributing tubes 45 is arranged at the upper end of the kiln, and, to promote uniform flow of the catalyst downwardly through the kiln, a series of apertured collector plates or baffles 46, 47, 48 and 49, each carrying appropriately arranged distributing tubes, is provided in the lower part of the kiln. Associated with the distributing tubes 45 and secured thereto by elements 50 are baskets 51, each having notches or serrations 52 and a round orifice 53.

In operation, spent catalyst is charged into the upper end of the kiln through connection 42 and regenerated catalyst is discharged from the lower end of the kiln through connection 34, the kiln being maintained substantially full of catalyst between the lower ends of the distributing tubes 45 and the collector plate 46. This charge of catalyst is divided into 10 bodies by 9 groups of tubes 55, 56, 57, 58, 59, 60, 61, 62 and 63, through which a cooling medium is circulated, each of these bodies being within a zone independent of the others for control purposes. Another and a somewhat larger group of collecting tubes 54 is arranged beneath the tenth body. For convenience of reference, these several zones are numbered in Fig. 2, the zone through which the catalyst first passes being numbered 1 and the zone through which the catalyst last passes being numbered 10. A grid of distributing troughs 64 for introduction of air is arranged centrally of each zone and is connected to the air manifolds 31. Two grids of collecting troughs 65 for removal of flue gases are arranged in each zone, one above and one below the grid of distributing troughs, both being appropriately connected to stack manifolds 32. In the last zone, the tenth, the grids of collecting troughs are spaced farther from the grid of distributing troughs than in the other zones, and the body of catalyst in this zone is larger than in the other zones, but in other respects the arrangement of the several zones is the same. In each zone, in operation, air enters the body of catalyst in that zone through the grid of distributing troughs 64, flows in part upwardly through the body of catalyst toward the grid of collecting troughs above the grid of distributing troughs and in part downwardly through the body of catalyst toward the grid of collecting troughs positioned below the grid of distributing troughs.

Valved connections 66, 67, 68, 69, 70, 71, 72, 73, 74 and 75 are provided for introducing steam from manifold 76 into the grid of distributing troughs in each of the ten zones. Valved connections 77 and 78 are provided for introduction of steam from manifold 76 into the uppermost grid of collecting troughs in zone 1, and into the stack manifolds 32. The steam introduced through the several connections may serve as a cooling agent, or, in an emergency, as a smothering agent.

If desired, baskets or boots 51 instead of being fastened to the tubes may be supported through suitable brackets or braces by the plate 44, or by the sides of the kiln. By means of these basket-like members catalyst flow from the tubes 45 is rendered essentially smooth and regular. In operation, catalyst flows both through the orifices and over the serrations part of the time, while at other times flow is through the orifices only. These serrations effectively eliminate the cascading or avalanching occurring where flow of a granular solid is directed over a straight edge.

The dimensions of the baskets and the positioning or spacing thereof with respect to the ends of the distributing tubes depends chiefly on the diameter of the tubes. The following table gives the dimensions and spacing for tubes having diameters of 4, 6, 8, 10 and 12 inches. In the table, $d$ equals the diameter of the tube; $d'$ equals the diameter of the basket; $c$ equals the distance $c$ (see Fig. 4); $e$ equals the distance $e$ (see Fig. 4); $f$ equals the depth of the basket measured as indicated in Fig. 4; $g$ equals the diameter of the orifice in the bottom of the basket; and $h$ equals the number of notches in the rim of the basket.

*Table I*

| $d$ | $d'$ | $c$ | $e$ | $f$ | $g$ | $h$ |
|---|---|---|---|---|---|---|
| Inches | Inches | Inches | Inches | Inches | Inches | |
| 6 | 12 | 1¾ | 1¼ | 7½ | 5 | 12 |
| 8 | ¹16 | 2¼ | 1¾ | 10 | 6 | 12 |
| 10 | ¹20 | 2⅞ | 2⅛ | 12 | 7½ | 12 |
| 12 | ¹24 | 3½ | 2½ | 15 | 9 | 12 |
| 4 | 8 | 1¼ | 1¼ | 7½ | 3 | 10 |

¹ Outer diameter.

Application of my invention to existing kilns does not necessitate any major changes in the kilns. However, the improved results attained in the use of my invention are not to be compared with its simplicity. My invention substantially increases the uniformity and regularity of catalyst flow in regenerating kilns of square cross section and accomplishes the improvements in operation naturally following from more uniform and regular catalyst flow.

My invention is not limited to regenerating kilns but may be applied to any vertical shaft reaction vessel of square cross section through which a granular solid is moved from top to bottom.

I claim:

1. The combination in a vertical shaft reaction vessel of square cross section provided with a port for introduction of a granular solid at its upper end and a port for discharge of the granular solid at its lower end, of a horizontal plate in the upper portion of the vessel for receiving the granular solid admitted through the first port, cylindrical tubes depending from the plate for distributing the granular solid over a horizontal section of the vessel, a basket-like element immediately below the lower end of each of the tubes having a serrated rim and an orifice in its bottom, and a vertical series of horizontally disposed apertured baffles in the lower part of the vessel above the discharge port.

2. The combination in a vertical shaft regenerating kiln of square cross section provided with a port for introduction of granular catalyst at its upper end and a port for catalyst discharge at its lower end, of a horizontal plate in the upper portion of the kiln for receiving catalyst admitted through the first port, cylindrical catalyst distributing tubes depending from the plate, a basket-like element positioned immediately below the lower end of each of the tubes having a serrated rim and an orifice in its bottom, said elements being supported by the tubes, and a vertical series of horizontally disposed apertured baffles in the lower portion of the kiln above the discharge port.

3. An apparatus for gas-solid contacting operation comprising: a vessel having a port for introduction of a granular solid at its upper end and a port for the discharge of the granular solid at its lower end, a horizontal partition plate in the upper portion of the vessel forming therewith a chamber adapted for receiving the granular solid admitted through the first named port, cylindrical tubes depending from said plate for distributing the granular solid in the vessel, a basket-like element immediately below the lower end of each of said tubes having a serrated rim and an orifice in its bottom, means for introducing contacting gas into said vessel, and means for withdrawing contacted gas from said vessel.

FRANK J. FONTANA.

REFERENCES CITED

The following references are of record in the file of this patent:

UNITED STATES PATENTS

| Number | Name | Date |
|---|---|---|
| 2,416,214 | Payne | Feb. 18, 1947 |